Oct. 15, 1968 V. F. GUGLER 3,405,681
CAKE ICING MACHINE
Filed Aug. 31, 1965
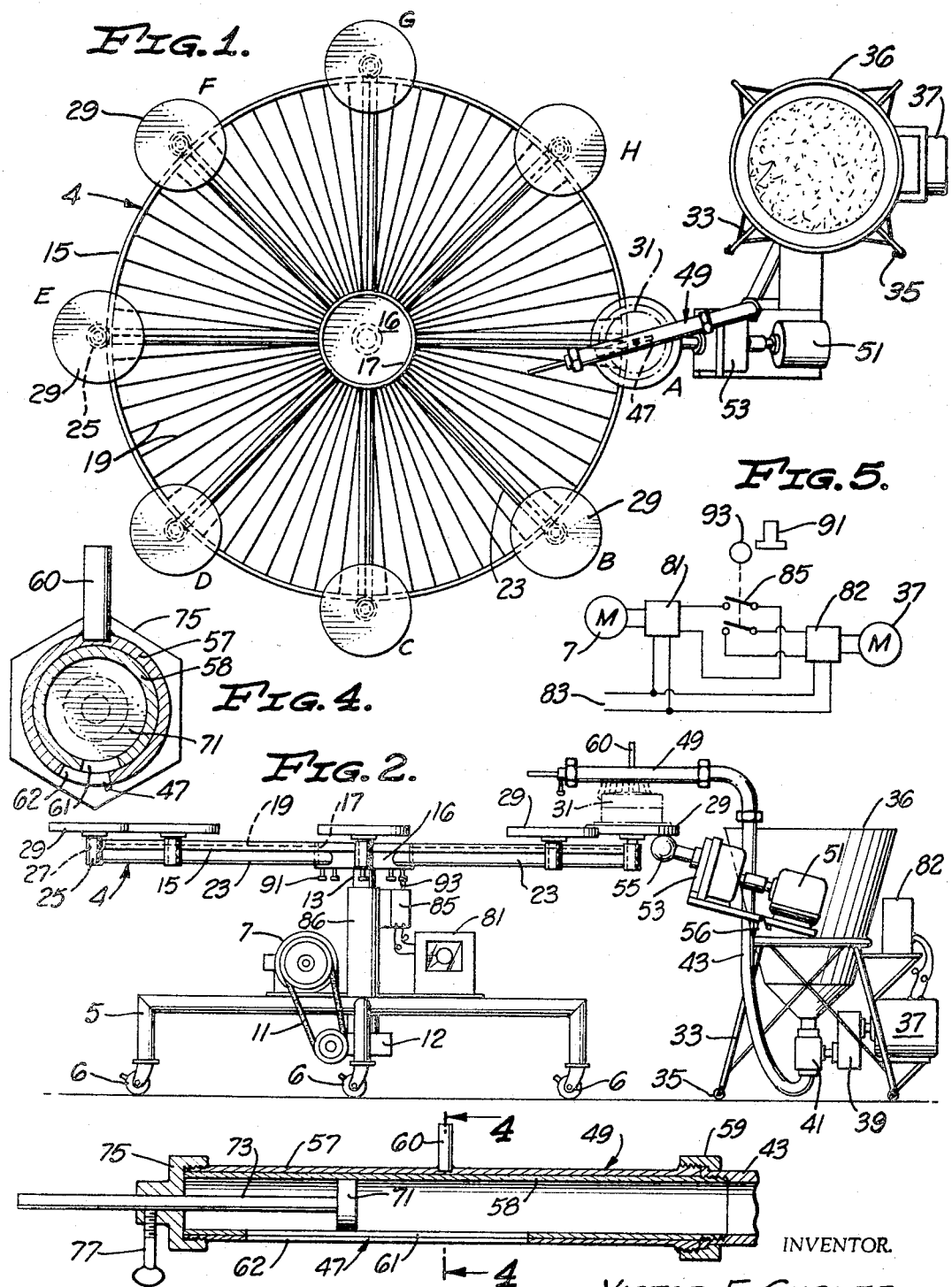
INVENTOR.
VICTOR F. GUGLER
BY HIS ATTORNEYS
HARRIS, KIECH, RUSSELL & KERN 3,405,681
CAKE ICING MACHINE
Victor F. Gugler, 8920 Helen Ave.,
Sun Valley, Calif. 91352
Filed Aug. 31, 1965, Ser. No. 483,930
2 Claims. (Cl. 118—25)

ABSTRACT OF THE DISCLOSURE

A cake icing machine comprising a rotatable carrier, circumferentially spaced turntables removably mounted on the carrier, a friction drive engageable with the lower side of each turntable to rotate same when it is in an icing station, and an icing dispenser for depositing icing on a cake on the turntable being rotated in the icing station.

Background of the invention

This invention relates to an apparatus for placing icing upon pastry such as cake.

A conventional cake icing apparatus includes a conveyor for carrying the cake. An operator lifts the cake off the conveyor, deposits and spreads the icing, and replaces the cake on the conveyor. Such an arrangement has been found unsatisfactory because of the large amount of time consumed in the icing operation.

Summary and objects of invention

Accordingly, it is an object of this invention to provide an apparatus which will perform the pastry icing operation much faster than conventional means.

It is a further object of the invention to provide a pastry icing machine which will allow efficient scheduling of the icing operation.

Another object of the invention is to provide an icing machine which will automatically deposit and at least partially distribute the icing on the pastry.

Another object is to provide icing means which will accurately meter the quantity of icing dispensed.

Still another object is to provide an icing apparatus which will ice pastries of different shapes and sizes.

The objects of the invention may be realized through the provision of a carrier having a plurality of designated areas thereon upon which pastry may be placed. The carrier is propelled intermittently and each time the carrier comes to rest a selected operation may be performed on the pastry. For example, pastry may be placed on one of the designated areas of the carrier. The carrier then automatically moves the pastry to a second position or station where, for example, icing may be automatically deposited on the pastry. In a few seconds, the pastry is automatically moved to a third station where, for example, the icing may be manually, evenly distributed over the surface of the pastry. At subsequent stations any number of operations such as decorating and removing the pastry may be performed. It is apparent that the number of stations provided may be varied in accordance with the work desired to be performed on the pastry.

The invention will be better understood from the following description when viewed in light of the accompanying drawing.

Description of drawing

In the drawing:
FIG. 1 is a top view of the pastry icing machine;
FIG. 2 is a front view of the pastry icing machine;
FIG. 3 is a partial sectional view of the icing dispenser;
FIG. 4 is an enlarged sectional view taken on line 4—4 of FIG. 3; and
FIG. 5 is an electrical diagram showing the controls for the pump motor and the carrier motor.

Description of preferred embodiment of invention

The means for conveying the pastry from one position to another is shown in FIGS. 1 and 2 and includes a carrier 4 pivoted to a support 5 mounted on rollers or casters 6 that may be of the locking type. A carrier motor 7 carried by the support 5 drives the carrier 4 through belt 11, suitable gears in gear box 12 and shaft 13. The carrier in the embodiment shown comprises a ring 15 and a central member 16 having an upwardly extending collar 17. The ring 15 and the central member 16 are connected by a plurality of small-diameter radial spokes 19 forming a deck. Emanating radially from the central member 16 below the spokes 19 are a plurality of larger-diameter arms 23 which terminate in journals 25 for rotatable shafts 27. A pastry supporting member 29 is attached to each shaft 27 and, accordingly, the supporting members may freely rotate relative to the journals 25 in turntable fashion with a bottom portion of each member engaging the corresponding journal. Each supporting member and its shaft 27 can be lifted in or from the corresponding journal. One of the members 29 is shown supporting a cake 31.

Although eight pastry supporting members are shown, this is for purposes of illustration only and any desired number of these members may be provided. In the specific embodiment shown, the pastry supporting members are illustrated as flat circular discs; however, any suitable shape may be employed. Furthermore, the members 29 need not be separate structural elements but may be constituted by designated spaced areas on the carrier.

Means are also provided to automatically deposit icing on the pastry when it reaches the position of the cake illustrated in FIGS. 1 and 2. The dispensing means includes a supporting frame 33 mounted on rollers 35. Mounted on supporting frame 33 is a bin 36 which contains icing. Electric pump motor 37 drives variable speed transmission 39 which turns pump 41 to force icing from bin 36 through rigid conduit 43 and elongated slot 47 of dispenser 49 onto cake 31. The dispenser is firmly held at the elevation shown in FIG. 2 by the rigid conduit; however, its lateral position relative to the carrier 9 may be changed, for example, by moving either or both of supports 5 and 33. Although separate supports for the pastry-transporting and depositing equipment are shown, it is within the scope of the invention to mount all of this equipment on a single support.

It is desirable to rotate each of the pastry supporting members 29 while such member is at station A adjacent the dispensing means, i.e., in the position of the supporting member which is shown in FIGS. 1 and 2 as supporting cake 31. Rotatable members 29 are particularly desirable when circular pastry such as a round cake is being iced. In this situation, the length of slot 47 in dispenser 49 is adjusted, by means described more fully hereinafter, to a length substantially equal to the radius of the round cake. Icing is then extruded through the elongated slot 47 in the form of a rather thick sheet which extends approximately from the center of the cake to or slightly beyond the periphery of the cake. As the pastry supporting member and cake are rotated one or more times, this sheet is spread quite evenly over the entire upper surface of the cake, thereby performing a considerable portion of the spreading operation. Preferably a portion of the icing overhangs the periphery of the cake as shown in FIG. 2, the overhanging portion being available for manual spreading over the side of the cake by an operator at a succeeding station. The operator can spread this portion evenly during later turning of the pastry supporting member without removing the cake therefrom.

The means for rotating the members 29 includes a motor 51, which runs continuously and drives gear reduction apparatus 53, which in turn causes a frictional drive element 55 to rotate. The frictional drive element is typically a round ball that frictionally engages the underside of pastry supporting members 29 when each advances to a position adjacent the dispenser 49. The rotation of the frictional drive element is thereby transmitted to the pastry supporting member 29 which is adjacent the dispenser 49. The underside of each pastry supporting member is normally at a level slightly below the top crest of the ball-like drive element 55 so that the supporting member is lifted slightly when it engages and is rotated by the drive element. The motor 51, gear reduction 53 and drive element 55 may be mounted on a base plate pivoted to a bracket 56 with the pivot axis arranged to counterbalance the members supported by the base plate and urge the drive element 55 upward or such members supported by the pivoted base plate may be thus urged by spring means.

Means are also provided to adjust the length and width of slot 47. This allows the machine to deposit any desired width and thickness of icing on many different sizes of pastry. The slot 47 is the effective area through the wall of the dispenser through which icing can pass. The amount of icing is determined by the length of time the motor 37 runs and the setting of the variable speed transmission 39.

The dispenser 49 and its adjustable elongated slot 47 can be of a construction best shown in FIGS. 3 and 4. The dispenser is there shown as comprising an outer tubular member 57 that can be turned on an inner tubular member 58 suitably attached to the end of the rigid conduit 43. A flanged nut 59 on the outer tubular member 57 engages a flange of the conduit 43 to permit this turning. A handle or lever 60 is fixed to the outer tubular member 57 and serves as a means for turning same relative to the inner tubular member 58. The outer and inner tubular members 57 and 58, respectively, provide longitudinally elongated openings 61 and 62 which when wholly or partially aligned form the slot 47. The degree to which the openings 61 and 62 are in alignment determines the width of the slot 47. The width of this slot can thus be varied by changing the angle of the handle or lever 60.

The length of slot 47 may also be varied. Slidably mounted within the inner tubular member 58 is a piston 71 having rod 73 which is slidable in an opening in an end cap 75 closing both tubular members. A thumbscrew 77 is secured by screw threads to the end cap and may be brought into engagement with the portion of the rod 73 which is within the end cap. To adjust slot length the thumbscrew 77 is partially unscrewed from the end cap and the rod is moved until piston 71 is at the position corresponding to the desired slot length. Thumbscrew 77 is then screwed into contact with rod 73 to hold the rod and piston firmly in place to establish and maintain the desired slot length.

It is also preferred to taper the slot 47 by having either or both of the elongated openings 61 and 62 increase slightly in width toward the end cap 75. This will allow dispening a uniform quantity of icing for the full length of the slot.

The carrier 4 desirably rotates intermittently to present each pastry support member 29 successively to stations indicated by the letters A–H. That is, the carrier must rotate through a given angle and then stop for a few, e.g., about 5 to 15, seconds while a support member 29 is at each station to allow the various operations such as icing dispensing, spreading and decorating to be performed. Thus, a cake may be placed on a support member at station H, the icing dispensed at station A and spread at station B, further decorations being applied at stations C–F, the finished cake being removed at station G, for example. Likewise, the icing dispensing operation at station A is intermittent and must be controlled so that icing is dispensed only when one of the pastry supporting members is adjacent or beneath the dispenser.

To perform these intermittent functions, a first commercially available timer 81 is connected to carrier motor 7 and a second commercially available timer 82 is connected to pump motor 37. Each timer is of the interval type and has output contacts connecting or disconnecting its motor to or from a source of electric current 83. Each timer has a control circuit in which is connected one set of contacts of a double-contact switch 85 as shown in FIG. 5. Switch 85, the purpose of which is to energize both timers, is spring biased into the normally open position shown in FIG. 5. The timer 81 is connected to stop the motor 7 when the control circuit of the timer is energized through the switch 85 and to restart this motor after a preset time interval. The timer 82 is connected to start the motor 37 when the control circuit of the timer is energized and stop this motor after a preset time.

When the switch is closed, by means which are described below, the timer 81 is energized and opens the circuit to carrier motor 7. A few seconds later the timer 81 restarts the carrier motor. Simultaneously with the closing of switch 85, the timer 82 is energized and closes the circuit to pump motor 37. A few seconds later, but before the carrier motor 7 is re-energized, the timer 82 opens the circuit to the pump motor. It is apparent, therefore, that with the closing of switch 85, the carrier 4 ceases rotating for a given short period and, for at least a portion of this period, icing is dispensed. To assure that the carrier motor and carrier will stop quickly when the circuit to the carrier motor is opened, the motor may be equipped with a magnetic brake of a type which is well known in the art.

The switch may be closed in several ways. In the specific embodiment shown, switch 85 is rigidly mounted on a column 86, FIG. 2. Above the switch a plurality of switch actuators 91 or bolts are secured in circular fashion in the bottom of the substantially cylindrical member 16 of the carrier 4. The switch actuators 91 may be equally spaced bolts with switch actuating heads that are preferably in or closely adjacent radial planes passing through the pastry supporting members 29. The switch has a cam portion or roller 93 projecting from its upper end for closing the switch. The roller extends upwardly into the path of the rigidly mounted switch actuators 91 so that as each actuator is rotated by carrier 4 into contact with the roller, it cams the roller to a depressed position to close the switch.

From the foregoing, it is believed that the operation of the device will be apparent. Briefly, however, the operation is as follows. The machine is set up so that the dispenser 49 will be above one of the pastry supporting members each time the carrier stops, e.g., at station A. Next, the desired size of slot 47 is selected in the manner already described. The timer 81 is set for the desired stop time for the carrier. The timer 82 is set for the desired icing-delivery time interval and the variable speed transmission 39 is adjusted to deliver the desired volume of icing during the latter time interval. A cake is then placed on the pastry supporting member at station H and the power is turned on. When the cake reaches a position beneath dispenser 49 one of the actuators 91 will be adjacent roller 93 and will cam it to a depressed position to close switch 85. When the switch is closed, the circuit to the carrier motor is opened automatically by timer 81 and carrier rotation is quickly halted by the magnetic brake of this motor so that the cake is positioned beneath the dispenser. Closing of switch 85 also energizes timer 82 which automatically starts pump motor 37 to deliver icing to the cake for a short interval, e.g., two seconds. When the desired amount of icing is dispensed, the timer 82 automatically turns off the pump motor. During the time the cake is adjacent the dispenser, the pastry supporting member on which it rests is rotated by motor 51. A few, e.g., about 5 to 15, seconds after the carrier has come to rest, the timer 81 automatically starts carrier motor 7 and the entire cycle is repeated so that each pastry supporting member is brought in sequence adjacent the dispenser.

When the cake, which has just received icing from the dispenser, reaches subsequent stations B–F, various operations such as additional spreading of the icing, decorating the cake, inspection of the cake, etc. are manually performed by operators at two or more of such stations while the cake remains on its pastry supporting member, which can be manually turned or turned by another motor similar to motor 51 to facilitate such operations. The finished cake can be removed from the carrier at station G by the same operator that placed it at station H.

Although exemplary embodiments of the invention are disclosed, it will be understood that other applications of the invention are possible and that the embodiments disclosed may be subjected to various changes, modifications, and substitutions without necessarily departing from the spirit of the invention.

I claim as my invention:

1. In a machine for icing cakes, or the like, the combination of:
   (a) a rotatable carrier;
   (b) circumferentially spaced, vertical journals on said carrier;
   (c) cake supporting turntables having depending shafts rotatable in said journals;
   (d) means for rotating said carrier to bring successive ones of said cake supporting turntables to an icing station;
   (e) means for depositing icing on a cake on each of said cake supporting turntables when it is in said icing station;
   (f) driving means frictionally engageable with the lower side of each of said cake supporting turntables when it is in said icing station for rotating such turntable;
   (g) said driving means including a rotatable driving element positioned in the path of and slightly above the level of the lower sides of said cake supporting turntables so that the lower side of each cake supporting turntable is slightly elevated by and automatically frictionally engages said driving element when such turntable is in said icing station;
   (h) the diameters of said shafts being less than the inside diameters of said journals throughout the entire lengths of said shafts so that said cake supporting turntables may be disengaged from said journals merely by lifting upwardly thereon to withdraw said shafts from said journals.

2. A machine for icing cakes according to claim 1 including:
   (i) means pivotally supporting said driving means for upward and downward movement of said driving element; and
   (j) counterbalancing means incorporated in said driving means for biasing said driving element upwardly to urge same into engagement with the driving surface of each of said cake supporting members at said icing station.

References Cited

UNITED STATES PATENTS

| | | | |
|---|---|---|---|
| 576,235 | 2/1897 | Stout et al. | 118—24 X |
| 1,618,053 | 2/1927 | Cates | 118—24 |
| 1,740,979 | 12/1929 | Golrick. | |
| 1,818,412 | 8/1931 | Litty et al. | 118—24 X |
| 1,827,876 | 10/1931 | Lang. | |
| 1,959,711 | 5/1934 | Flint et al. | 118—319 |
| 2,320,529 | 6/1943 | MacManns | 118—24 |
| 2,796,847 | 6/1957 | Guggenheim | 118—411 |
| 2,897,777 | 8/1959 | Schur | 118—411 X |
| 2,887,985 | 5/1959 | Way et al. | 118—319 X |
| 2,917,272 | 12/1959 | Kollman et al. | 118—25 X |
| 2,930,345 | 3/1960 | Jacobsen et al. | 118—319 X |
| 3,029,776 | 4/1962 | Proskauer | 118—411 |
| 3,276,397 | 10/1966 | Poppe et al. | 118—24 X |
| 2,531,093 | 11/1950 | Walker | 118—24 |

FOREIGN PATENTS

| | | |
|---|---|---|
| 447,219 | 5/1936 | Great Britain. |

CHARLES A. WILLMUTH, *Primary Examiner.*